United States Patent [19]

Danchilla

[11] 4,222,028
[45] Sep. 9, 1980

[54] VEHICLE MESSAGE REMINDER SYSTEM

[76] Inventor: Peter G. Danchilla, 7459 12th Ave., #6A, Burnaby, British Columbia, Canada, V3N2k2

[21] Appl. No.: 847,129

[22] Filed: Oct. 31, 1977

[51] Int. Cl.² ............................................. G08B 29/00
[52] U.S. Cl. ............................... 340/52 D; 307/10 R; 340/309.1; 179/100.1 R
[58] Field of Search ................. 340/52 R, 52 D, 52 F, 340/53, 52 E, 309.1, 309.6; 307/10 R; 179/100.1 R, 100.1 C

[56] References Cited

U.S. PATENT DOCUMENTS

| 2,288,683 | 7/1942 | Clancy | 340/52 F |
|---|---|---|---|
| 2,924,817 | 2/1960 | Dawkins et al. | 340/52 E |
| 3,275,756 | 9/1966 | Vauquelin et al. | 340/52 R |
| 3,870,818 | 3/1975 | Barton et al. | 179/1 SM |
| 3,947,812 | 3/1976 | Lee et al. | 340/52 D |

Primary Examiner—John W. Caldwell, Sr.
Assistant Examiner—Joseph E. Nowicki
Attorney, Agent, or Firm—Howard I. Podell

[57] ABSTRACT

A vehicle message reminder system which includes a timer for closing a timer switch when energized and retaining the switch in closed position for a pre-set time after which the timer coil is de-energized. A relay connected to the timer energizes a tape recorder hooked-up thereto during the time when the ignition switch and timer switch are in closed positions. The tape recorder is of conventional design and has recorded messages relating to the operation of the vehicle.

2 Claims, 3 Drawing Figures

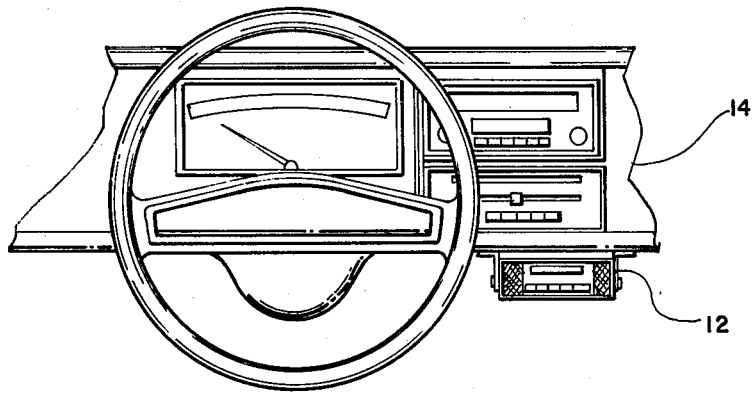
FIG. 1
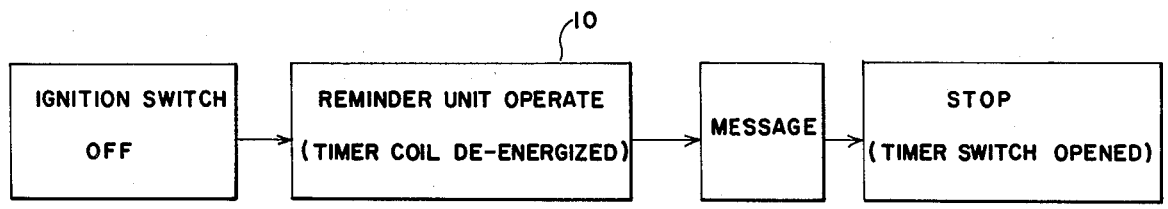
FIG. 2
FIG. 3
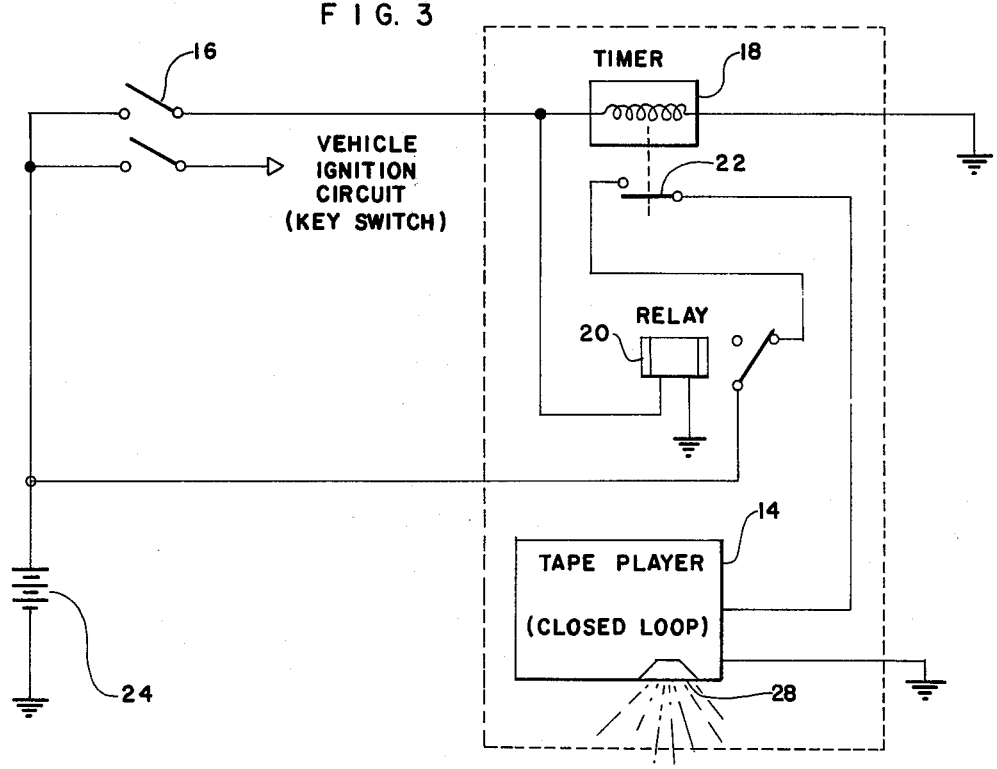

VEHICLE MESSAGE REMINDER SYSTEM

FIELD OF THE INVENTION

This invention relates generally to a vehicle message reminder assembly which gives the motorist an audible message.

STATEMENT OF PRIOR ART

The prior art, as exemplified by U.S. Pat. Nos. 2,780,797; 2,598,056; 2,706,806 and 3,473,083 is generally illustrative of various devices of this type. While such devices are generally acceptable for their intended purpose they have not proven to be entirely satisfactory in that they are either complex and expensive to manufacture, or bulky and inconvenient to use, or require unusual skill and/or dexterity to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

A main object of this invention is to provide a novel automatic reminder system for motor vehicles which furnishes dependable audible indications to remind the operator of a motor vehicle to perform certain actions connected with the operation of the vehicle.

Other objects will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a vehicle message reminder system which includes a timer for closing a timer switch when energized and retaining the switch in closed position for a preset time after which the timer coil is de-energized. A relay connected to the timer energizes a tape recorder hooked-up thereto during the time when the ignition switch and timer switch are in closed positions. The tape recorder is of conventional design and has recorded messages relating to the operation of the vehicle.

BRIEF DESCRIPTION OF THE DRAWING

In the accompanying drawing, in which is shown one of the various possible illustrative embodiments of this invention, wherein like reference character identify the same or like parts:

FIG. 1 is a front elevation of a vehicle dashboard equipped with the system of the invention;

FIG. 2 is a schematic diagram of the system; and

FIG. 3 is a circuit diagram of the system.

DESCRIPTION OF THE PREFERRED EMBODIMENT

With reference to the drawing, there is shown and illustrated a vehicle message reminder system constructed in accordance with the principles of the invention and designated generally by reference character 10.

The system of the present invention operates on generally the same principle as a telephone answering device by giving audible instructions when the vehicle's ignition is turned off. Typical messages given by the system in response to frequently occurring contingencies in the operation of a vehicle are: "Lock The Doors"; "Don't Forget The Keys"; "Turn Off The Lights"; "Put Coin In The Meter"; and the like.

The system includes a tape player 12 of conventional closed loop type mounted on the dashboard 14 of a vehicle, as shown in FIG. 1.

The sequence of operation of the system is shown in FIG. 2. As indicated, turning off the ignition switch 16 actuates the tape player which then stops after giving its messages.

FIG. 3 shows the circuit diagram for the system which includes a timer 18. Preferably, is of the Agastat timer type II. The timer is connected with the ignition switch 16; with a relay 20 and a timer switch 22 which connects tape player 14 and vehicle battery 24.

The timer 18 closes timer switch 22 when energized and retains the switch in closed position for a pre-set time period after which the timer's coil is de-energized. The relay 20's contacts energizes the tape player 14 for the time period when the ignition switch 16 is off and the timer switch 22 is in closed position.

The tape player passes a closed loop of tape past a playback head with a timer set for a period of one complete cycle of tape. The player includes a loudspeaker unit and a microphone for recording other messages, as desired.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A vehicle message reminder system connected to a conventional key operated ignition switch of a vehicle, comprising, in combination, a timer having a timing switch that is closed to the ON position of the timing switch upon electrical energization of a coil in the timer, said timer coil being energized by turning on said key operated ignition switch and de-energized by turning off said key operated ignition switch; said timing switch being connected to the vehicle battery; a tape player of the closed loop type connected to said timing switch and to a relay; said relay energizing said tape player for a period of time during which said ignition switch is off and said timing switch is in its closed ON position; said tape player including a loudspeaker and giving reminder messages relating to vehicle operations taking place after said vehicle is parked, in which said timer retains said timing switch in the ON position for a pre-set time period after the coil of the timer has been electrically de-energized by the turning off of the key operated ignition switch.

2. The combination as recited in claim 1 in which said timer is of the category of the Agastat type, type II.

* * * * *